Feb. 25, 1969   P. G. SPEICH   3,429,086
ROTARY APPARATUS FOR PREVENTING OBSCURING OF THE VISIBILITY
THROUGH A WINDSHIELD BY THE PRESENCE OF CONDENSATE OR
WATER SPLASHED THEREON
Filed Jan. 23, 1967
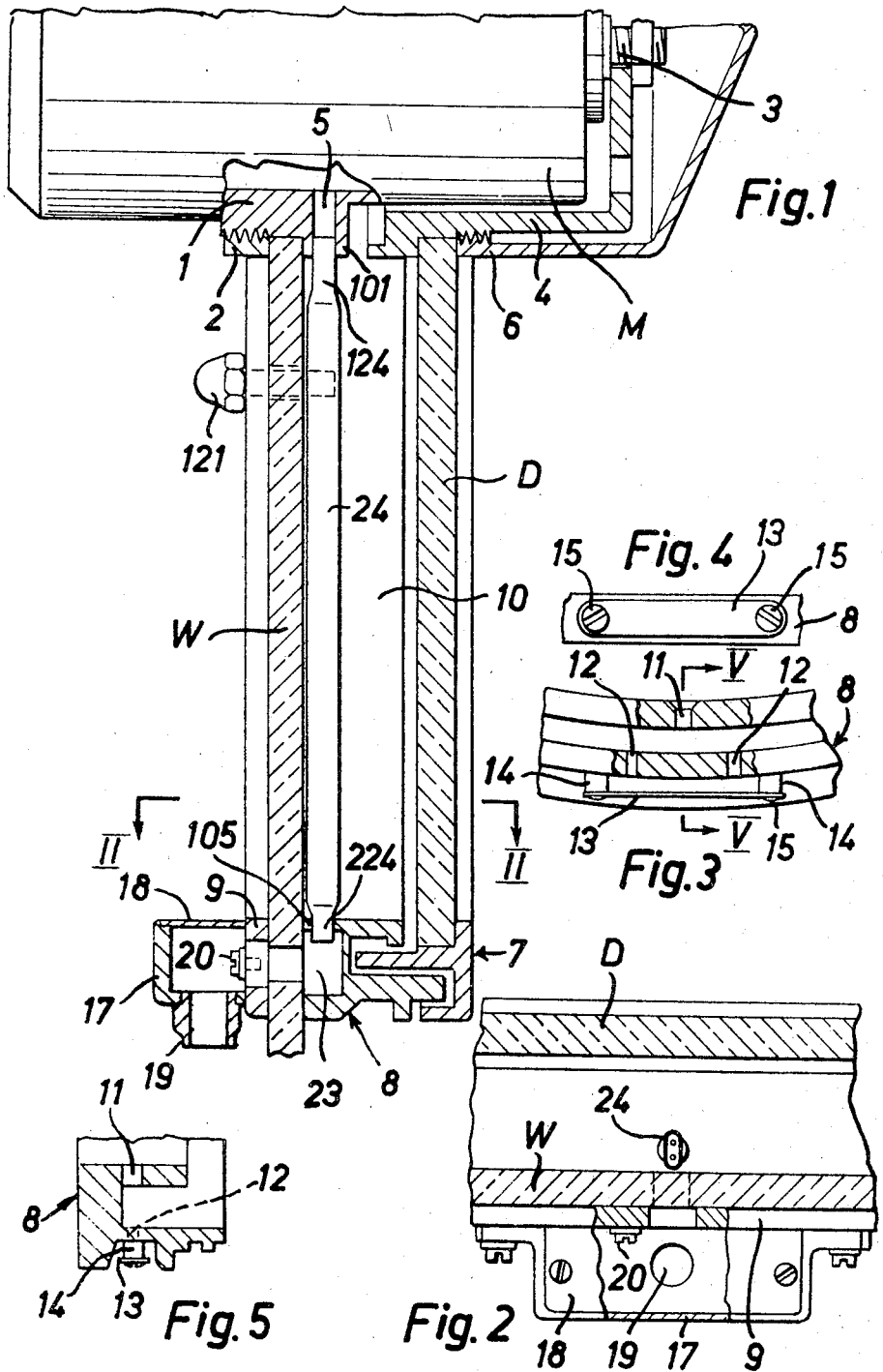

United States Patent Office 3,429,086
Patented Feb. 25, 1969

3,429,086
ROTARY APPARATUS FOR PREVENTING OB-
SCURING OF THE VISIBILITY THROUGH A
WINDSHIELD BY THE PRESENCE OF CON-
DENSATE OR WATER SPLASHED THEREON
Pier Gianni Speich, 7C Via Domenico Chiodo,
Genoa, Italy
Filed Jan. 23, 1967, Ser. No. 616,745
Claims priority, application Italy, Jan. 24, 1966,
1,670/66
U.S. Cl. 52—171        7 Claims
Int. Cl. B60s 1/02; B64d 15/16

ABSTRACT OF THE DISCLOSURE

A transparent disc is mounted on a motor shaft so as to rotate rapidly in front of and parallel to a windshield in spaced relation therefrom so as to form a gap therebetween. A rotatable labyrinth joint member is provided at the periphery of said disc and a corresponding complementary fixed labyrinth joint member is mounted on the windshield. The windshield has a hole in which is mounted an electrical motor provided with a shaft coupled to said disc to drive the same and a metal duct is fastened substantially radially with respect to said disc, between a hole in the motor casing and a hole in a grounded metal part integral with said fixed labyrinth joint member whereby the duct electrically grounds the casing of the motor; the duct contains electrical leads connecting a source of current with the motor winding.

---

This invention relates to centrifugal defrosting or clear-vision apparatus for vehicles, and particularly for ships, motor boats, air planes and other vehicles provided with windows or windshields, in front of the pilot or driver, which should be maintained clear of any matter tending to obscure vision therethrough, such as condensate, water splashes, snow and the like and by which this end is attained by mounting in front of the window or windshield (which, for simplicity, shall be simply called windshield) and spaced therefrom a revolving transparent disc mounted on a rapidly revolving shaft or spindle, and at the periphery of the revolving transparent disc an element of a labyrinth joint is fastened which co-acts with a complementary fixed member of the labyrinth joint fastened on to the fixed windshield or the like. Holes are provided in the windshield members for permitting the discharge of water formed or otherwise leaking into the space between the windshield and the revolving disc.

The invention is an improvement over existing clear-vision apparatus of this kind and aims to provide means for feeding without any danger the electric current to an electric motor which drives the revolving-disc driving spindle and for connecting to ground the casing of said electric motor so as to avoid any possibility of danger of electrical shocks.

Further improvements of the invention consist in means for preventing the inlet of outside water, for example rain water or wave splash water into the space defined by the windshield, the revolving transparent disc and the interengaging joint members carried by said windshield and revolving disc.

Further improvements and advantages will be apparent from the following description of one preferred embodiment of the invention which consists in an arrangement of means permitting the inserting of the electric leads for feeding the current to the transparent disc-driving electric motor in a substantially rigid duct provided with conductive means which may be connected to the outer metallic parts of the motor and to the ground.

In the preferred embodiment of the invention, the said rigid duct is in form of a metallic tube or a metallic channel whose intermediate part may be conveniently closed even by an adjacent member, while its ends are closed in tapered tubular form and are forced into at least one metallic member connected to ground, and into a hole formed in a metallic part integral of the motor casing. The invention aims also to provide a method for mounting said channel or tube.

Further improvements and characteristic features of the invention will be apparent from the following description of the invention, with reference to the appended drawings, wherein:

FIGURE 1 is a radial cross section through one-half of a preferred embodiment of a centrifugal anti-dim or clear-vision apparatus according to the invention, fitted on a window glass or windshield;

FIGURE 2 is a vertical section taken on line II—II of FIGURE 1;

FIGURE 3 is an elevation view with parts in section of a metallic profiled ring fastened to the windshield;

FIGURE 4 is a bottom plan view of the arrangement shown in FIGURE 3; and

FIGURE 5 is a cross-section taken on line V—V of FIGURE 3.

With reference to FIGURES 1 and 2 of the drawings, W is a windshield glass section of a vehicle, in front of the pilot or the driver, and which glass should be maintained transparent or and clear, and protected from splash water, under any adverse condition.

In order to ensure this, there is disposed in front of said windshield section W a centrally perforated transparent disc D rotatably mounted by being inserted upon, and fastened by means of a sleeve 6 to a bell-shaped extension 4 of the shaft 3 of an electric motor M mounted in a hole of said window glass W. To this end, the motor casing 1 is provided with an abutment collar 101 and is inserted into the said glass hole by its end opposite the motor shaft until said abutment 101 abuts against said glass W. The motor M is fastened to the windshield by means of a conventional screw-threaded locking ring 2.

The disc D is provided at its periphery with a substantially U-shaped rim 7 forming a rotatable member of a labyrinth joint whose wings engage in corresponding annular recesses of the complementary fixed labyrinth joint member 8 fastened in a corresponding position of the glass W. The assembly is so constructed and arranged as to form between glass W and disc D a gap or chamber 10 closed at its periphery by a labyrinth joint and at its outer side by disc D, which may be rapidly rotated by the motor shaft 4, thus eliminating by centrifugation any condensate, brine or splash water which may come into contact therewith.

In order to discharge any condensate from the gap 10, there are provided at the bottom of labyrinth member 8, angularly displaced outlets holes 11–12 and in order to prevent outside water from penetrating through these holes into gap 10, a baffle plate 13 (see FIGURES 3, 4 and 5) is mounted on and spaced from labyrinth member by screws 15 and spacing sleeves 14.

By mounting the motor M in a hole of the glass plate W, the problem arises of how to feed the electric current thereto, while ensuring an efficient grounding of the electrically insulated motor casing 1 without having recourse to objectionable outside leads.

This problem is solved, according to the invention, by providing a rigid duct 24 having tapered ends 124–224 adapted to be forced into holes 5 and 105 of motor casing abutment 101 and of labyrinth joint 8 respectively. Duct 24, which may be tubular, as shown, or channel-shaped with its open side turned towards and practically into contact with glass W, houses the wires (see FIGURE 2) which feed the current to the motor M, by coming from outside through tubular nipple 19 fastened to a box 17 provided with a dismountable lid 18 and fastened to a metallic counter-ring 9 suitably fastened to the labyrinth member 8 by screws 121 through holes in the windshield W. The motor casing 101 is connected to ground by a lead (not shown) connected to counter-ring 9 by as by screw 20 and to ground in any conventional manner. The ground lead may pass inside or outside duct 24 and be electrically connected to the metallic motor casing abutment 101. According to the preferred embodiment as shown, the tubular duct 24 is metallic and itself constitutes the ground conductor.

Furthermore in the embodiment as shown, the tubular duct 24 has an oblate profile, such as an oval or the like, so as to maintain the two electric leads passing therethrough side-by-side or one above the other in a stable and substantially parallel position, for example as shown in FIGURE 2. Preferably, the tube 24 has at its entrance, for example, a circular profile and is subsequently squeezed transversally, after having passed the leads therethrough.

The mounting of duct or tube 24 may be effected as follows:

By keeping tube 24 slightly inclined with respect to the plane of the glass W and/or with respect to the radial direction, the inner end 124 of said tube 24 is inserted into the hole 5 of motor casing 101 and is pushed as deeply as possible into this hole. Tube 24 may be then shifted into an exactly radial position and parallel to the plane of the glass W and its outer end 224 may be arranged co-axially with the respective hole 105 of the fixed ring 8. This outer end 224 of tube 24 may be inserted into the corresponding hole 105, by shifting tube 24 axially outwardly and by causing its inner end 124 to slide into the hole 5. For dismantling, the procedure is effected in reverse manner.

Of course, it is possible to insert the outer end 224 of tube 24 into the hole 105 of ring 8 first and then, by proceeding in the same manner, the inner end 124 may be inserted into the hole 5 of motor casing 101. The electric leads which come out of the recess 23 of ring 8 through hole 105 are passed through tube 24 before effecting the above-described mounting.

Of course, the invention is not limited to the embodiment which has been just described and shown, but may be varied and modified, especially constructively. Thus, for example, the duct 24 may be arranged on the inner side of the glass W, and may be extended between the motor casing 101 and the counter ring 9 by means of which the outer ring 8 is fastened to said glass W. Furthermore, any other suitable means may be provided for fastening and locking the ends of the small tube or of the channel profile to the motor casing 101 and/or of the fixed ring 8, without departing from the spirit of the invention as above described and as defined hereinafter in the claims.

I claim:

1. Apparatus arranged in front of a fixed windshield of a vehicle to prevent obscuring of the visibility therethrough by condensate or water splashed thereon, said apparatus comprising a transparent disc rotatably supported adjacent said windshield in spaced relation therefrom, said windshield having a hole therein, a motor mounted in said hole and including a metallic casing secured to said windshield and a shaft coupled to said disc to rotate the same, a seal between said disc and windshield comprising a fixed joint member attached to said windshield, and a rotatable joint member attached to said disc and engaging said fixed joint member, said casing and said fixed joint member having aligned openings therein, a duct engaged in said openings in the casing and the fixed joint member, and electrical leads in said duct for connecting said motor with a source of current, said duct being metallic and electrically conductive and connected to said casing and electrical ground whereby said duct provides electrical grounding of said motor casing.

2. Apparatus as claimed in claim 1, wherein said fixed joint member includes a metallic portion at the location where the opening is formed for receiving said duct, said metallic portion being connected to electrical ground whereby when the duct is inserted into the opening in said metallic portion it becomes connected to electrical ground.

3. Apparatus as claimed in claim 2 comprising a ring mounted on said windshield connected to said metallic portion of the fixed joint member and to electrical ground.

4. Apparatus as claimed in claim 1, wherein said duct has tapered ends which are engaged into said aligned openings with force fit.

5. Apparatus as claimed in claim 4, wherein said ends of the duct are circular in cross-section and the duct has a non-circular cross-section between said ends.

6. Apparatus as claimed in claim 1, wherein said fixed joint member has a lower end provided with discharge outlets for water, the apparatus further comprising a baffle plate beneath said outlets and means supporting the baffle plates in spaced relation below said outlets to prevent entry of water thereinto.

7. Appartaus as claimed in claim 1, wherein said motor shaft includes a bell-shaped extension, said disc being secured to said extension for rotation therewith.

References Cited

UNITED STATES PATENTS

| | | | |
|---|---|---|---|
| 1,568,200 | 1/1926 | Aegerter et al. | 296—84 |
| 3,188,700 | 6/1965 | Herrmann et al. | 52—171 |

FOREIGN PATENTS

| | | |
|---|---|---|
| 739,794 | 11/1955 | Great Britain. |

LEO FRIAGLIA, *Primary Examiner.*

JOHN A. PEKAR, *Assistant Examiner.*

U.S. Cl. X.R

296—84